(12) United States Patent
Clark et al.

(10) Patent No.: US 8,914,473 B2
(45) Date of Patent: *Dec. 16, 2014

(54) FIRMWARE UPGRADE SYSTEM AND METHOD IN A DEVICE MANAGEMENT ARCHITECTURE

(75) Inventors: David Richard Clark, Kitchener (CA); Vinaykumar Acharya, Hanover Park, IL (US); Thomas Parry, Waterloo (CA); Jason Lee Carter, Sunrise, FL (US)

(73) Assignee: BlackBerry Limited, Waterloo (CA)

( * ) Notice: Subject to any disclaimer, the term of this patent is extended or adjusted under 35 U.S.C. 154(b) by 202 days.

This patent is subject to a terminal disclaimer.

(21) Appl. No.: 13/586,957

(22) Filed: Aug. 16, 2012

(65) Prior Publication Data

US 2012/0311559 A1  Dec. 6, 2012

Related U.S. Application Data (63) Continuation of application No. 12/819,987, filed on Jun. 21, 2010, now Pat. No. 8,307,095.

(51) Int. Cl.
*G06F 15/16* (2006.01)
*G06F 9/445* (2006.01)

(52) U.S. Cl.
CPC ..................................... *G06F 8/65* (2013.01)
USPC ........................... 709/219; 709/226; 709/227

(58) Field of Classification Search
CPC ............ G06F 8/665; G06F 8/45; H04L 67/34
USPC .................. 709/217, 219, 223, 226, 227, 229
See application file for complete search history.

(56) References Cited

U.S. PATENT DOCUMENTS

| | | | |
|---|---|---|---|
| 6,687,901 B1 | 2/2004 | Imamatsu | |
| 7,191,327 B2 * | 3/2007 | Viljoen et al. | 713/2 |
| 7,412,232 B2 | 8/2008 | Wilson et al. | |
| 7,480,907 B1 | 1/2009 | Marolia et al. | |
| 7,716,661 B2 | 5/2010 | Paul | |
| 7,809,366 B2 | 10/2010 | Rao | |
| 7,844,964 B2 | 11/2010 | Marolia | |
| 7,873,959 B2 | 1/2011 | Zhu | |
| 8,051,009 B2 | 11/2011 | Lyman et al. | |

(Continued)

FOREIGN PATENT DOCUMENTS

CA           2743685         12/2011

OTHER PUBLICATIONS

USPTO, Office Action, U.S. Appl. No. 12/819,987, May 22, 2012, 8 pgs.

(Continued)

*Primary Examiner* — Viet Vu
(74) *Attorney, Agent, or Firm* — The Danamraj Law Group, P.C.

(57) ABSTRACT

In one embodiment, a device firmware upgrade scheme is disclosed for upgrading a device image of a mobile communications device. A device management session is established between the mobile communications device and a first server using a first protocol. Upon obtaining identity information of a second server operable to compute or otherwise determine a customized upgrade process, a device inventory is transmitted to the second server using a second protocol. Upon receiving the customized upgrade process, the mobile communications device downloads one or more upgrade files from one or more resources. Thereafter, the mobile communications device is operable to provide a status indication to the first server using the first protocol.

20 Claims, 6 Drawing Sheets

(56) References Cited

U.S. PATENT DOCUMENTS

| | | |
|---|---|---|
| 8,131,875 B1 | 3/2012 | Chen et al. |
| 2005/0039178 A1 | 2/2005 | Marolia |
| 2005/0055397 A1 | 3/2005 | Zhu |
| 2008/0235386 A1 | 9/2008 | Oommen |
| 2009/0075641 A1 | 3/2009 | Guven et al. |
| 2009/0260004 A1 | 10/2009 | Datta |
| 2009/0318124 A1 | 12/2009 | Haughn |
| 2010/0017793 A1* | 1/2010 | Grover et al. ............ 717/168 |
| 2011/0124325 A1 | 5/2011 | Choi-Grogan et al. |

OTHER PUBLICATIONS

USPTO, Notice of Allowance, U.S. Appl. No. 12/819,987, Jul. 19, 2012, 6 pgs.

CIPO, Office Action, Application No. 2,743,685, Feb. 5, 2013, 2 pgs.

CIPO, Office Action, Application No. 2,743,685, Dec. 10, 2013, 3 pgs.

* cited by examiner

FIRMWARE UPGRADE SYSTEM AND METHOD IN A DEVICE MANAGEMENT ARCHITECTURE

CROSS REFERENCE TO RELATED APPLICATION(S) AND CLAIM OF PRIORITY

This nonprovisional application is a continuation application claiming the benefit of the following prior United States patent application entitled: "FIRMWARE UPGRADE SYSTEM AND METHOD IN A DEVICE MANAGEMENT ARCHITECTURE", filed Jun. 21, 2010, application Ser. No. 12/819,987, now issued as U.S. Pat. No. 8,307,095, which is hereby incorporated by reference.

FIELD OF THE DISCLOSURE

The present patent disclosure generally relates to device management techniques. More particularly, and not by way of any limitation, the present patent disclosure is directed to a firmware upgrade system and method operable in a device management architecture.

BACKGROUND

Many carrier network operators are deploying Open Mobile Alliance (OMA) Device Management (DM) (OMA DM) compliant implementations of Firmware Upgrade Over The Air (FOTA), a standards-based approach to upgrading core device software wirelessly. However, there are some aspects of the OMA DM FOTA model that limit its effectiveness for certain handheld devices such as, e.g., smart phones or any handset with a complex firmware definition.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

The present patent disclosure is broadly directed to a device firmware upgrade scheme that facilitates integration of third party upgrade service logic within existing industry-standard OMA DM platforms. Additionally, the embodiments herein allow for handing complex device image information in computing customized device upgrade patches, including upgrading of full size executable files. Broadly, a device management session is established between a mobile communications device and a first server using a first protocol, whereupon identity information (including such as, e.g., location, address, resource name/path, URI/URL information, etc.) of a second server adapted to compute customized upgrade processes is obtained by the mobile communications device. Device inventory information is then transmitted to the second server using a second protocol. Upon receiving the customized upgrade process, which includes identity information of one or more resource locations having appropriate content servers, the mobile communications device downloads one or more upgrade files from the identified resource locations as needed. Thereafter, the mobile communications device is operable to provide a status indication to the first server using the first protocol.

In one aspect, an embodiment of a device firmware upgrade method practiced by a mobile communications device is disclosed. The claimed mobile communications device obtains from a first server, using a first protocol, identity information of a second server adapted to compute, calculate or otherwise determine a customized upgrade process with respect to a device image of the mobile communications device. The mobile communications device transmits device image information relating to the device image to the second server using a second protocol. Thereafter, the mobile communications device receives an upgrade process from the second server, wherein the upgrade process is customized relative to the mobile communications device and includes identity information of one or more resources. The mobile communications device downloads one or more upgrade files from one or more resources based on the upgrade process. Upon completion of upgrading at least a portion the device image, the mobile communications device may provide a status indication to the first server using the first protocol.

In another aspect, an embodiment of a mobile communications device is disclosed. The claimed embodiment of the mobile communications device includes, among others, a processor and one or more subsystems and associated software/firmware, which may be configured as components adapted to perform the following functions: engaging in a device management session with a first server using a first protocol and to obtain from the first server identity information of a second server adapted to compute, calculate or otherwise determine a customized upgrade process with respect to the mobile communications device; transmitting device image information relating to a device image associated with the mobile communications device to a second server using a second protocol; processing information defining an upgrade process received from the second server, wherein the upgrade process is customized relative to the mobile communications device and includes identity information of one or more resources; downloading one or more upgrade files from one or more resources based on the upgrade process; and upon completion of upgrading at least a portion the device image based on the one or more upgrade files, providing a status indication to the first server using the first protocol.

In a still further aspect, an embodiment of a device firmware upgrade server is disclosed. The claimed embodiment of the device firmware upgrade server includes, among others, a processor and one or more subsystems and associated software/firmware, which may be configured as components adapted to perform the following functions: processing device inventory information received from a mobile communications device; determining or computing a customized upgrade process with respect to the mobile communications device based on the device inventory information; and transmitting the customized upgrade process to the mobile communications device, wherein the customized upgrade process includes identity information of one or more resources having one or more downloadable upgrade files for the mobile communications device.

Figure 1:
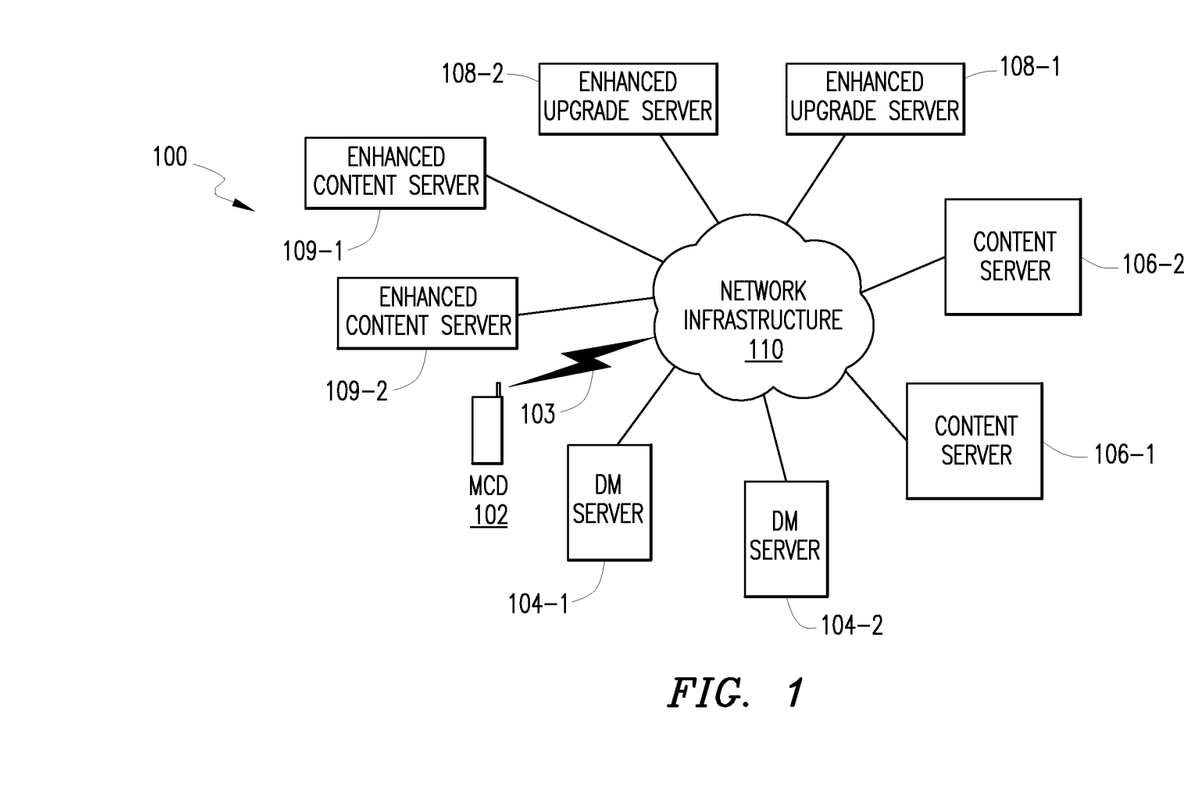
FIG. 1 depicts an example network environment wherein an embodiment of the present patent application may be practiced.

A system and method, as well as associated device, computer-accessible media, and network node, of the present patent disclosure will now be described with reference to various examples of how the embodiments can be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary network environment 100 wherein an embodiment of the present patent application may be practiced for purposes of device firmware upgrade and management, inter alia. Network environment 100 comprises, inter alia, a network infrastructure 110 and at least one client device 102 such as, e.g., a mobile communications device (MCD), in communication with the network infrastructure 110 via a communications link 103. The principal task of network infrastructure 110 for purposes of the present disclosure is to provide one or more communication paths between a client device 102, that requires device management/upgrading, and one or more nodes or entities that operate as servers with respect to one or more aspects of device upgrading and management as will be set forth in detail hereinbelow. Network infrastructure 110 may comprise one or more networks which may be implemented using any known or heretofore unknown technologies and architectures, and may for example include any combination of wired networks, wireless networks, short-range or long-range radio frequency (RF) networks, carrier networks, access networks, core networks, enterprise networks, circuit-switched networks, or packet-switched networks. Any of these may span one or more geographic sites and be organized as a local area network (LAN), wide area network (WAN), metropolitan area network (MAN), or Wireless LAN (WLAN), alone or in any combination, and may include elements of intranets, the Internet, and any other suitable private, carrier, leased, or virtual private network (VPN) facilities, alone or in any combination. Where a wireless network is included, it may for instance be comprised of a General Packet Radio Service (GPRS) network that provides a packet radio access for mobile devices using the cellular infrastructure of a Global System for Mobile Communications (GSM)-based carrier network. In other implementations, the wireless network may comprise an Enhanced Data Rates for GSM Evolution (EDGE) network, a Long Term Evolution (LTE) network, an Integrated Digital Enhanced Network (IDEN), a Code Division Multiple Access (CDMA) network, a Universal Mobile Telecommunications System (UMTS) network, any 2nd-2.5-3rd- or subsequent Generation networks, a WLAN network employing WIFI or WIMAX technologies, or any other suitable wireless network. Communications link 103 may be realized as any suitable wireless network connection. Communications link 103 could also be realized via suitable wired means in some implementations.

The network environment 100 may include one or more Device Management (DM) servers, e.g., servers 104-1 and 104-2, as well as one or more content servers (which may also be referred to as download servers), e.g., servers 106-1 and 106-2, that host one or more device upgrade files that can be downloaded to the client device 102 pursuant to an appropriate set of procedures and techniques. In an embodiment, DM servers 104-1 and 104-2 are compliant with OMA Device Management procedures and techniques, and files are downloaded to the client device 102 pursuant thereto. Accordingly, communications relative to device management and firmware upgrading involving the client device 102 and one or more DM servers 104-1, 104-2 and one or more content servers 106-1, 106-2 are effectuated using a first protocol, e.g., the OMA DM protocol. In one arrangement, the DM servers 104-1, 104-2 and the content servers 106-1, 106-2 may be deployed as part of a carrier network implementation.

Further, the network environment 100 may also include one or more enhanced device upgrade servers adapted to execute device upgrade procedures that can manage complex device images, wherein the complex device images may include but is not limited to exhaustive device inventories such as software/firmware versions of various pieces of software (e.g., application programs, non-application programs, operating systems, kernels, drivers, protocol stacks, etcetera), user preferences, device status (e.g., as to what is installed), as well as other device- and/or manufacturer-specific information, for purposes of computing or otherwise determining one or more customized upgrade recipes or processes for a client device. In one implementation, the customized upgrade process may also include appropriate information for identifying or locating a resource from which the device upgrade files may be obtained (i.e., one or more download servers that actually host the downloadable device upgrade files). For example such information may include but is not limited to information relating to addresses or locations, Uniform Resource Locators (URLs), Uniform Resource Names (URNs), Uniform Resource Identifiers (URIs), or other resource paths, etcetera; collectively referred to as "identity information" herein. One or more implementations of how an "upgrade process" provides the identity information to a client device will be set forth in detail below. By way of illustration, enhanced upgrade servers 108-1, 108-2 exemplify the servers having the service logic necessary for computing or determining customized upgrade recipes based on complex device image data according to an embodiment of the present disclosure. Likewise, reference numerals 109-1 and 109-2 refer to illustrative enhanced content servers operating as download servers that host appropriate content (e.g., one or more device upgrade files) for purposes of upgrading at least a portion of the device image of a client device such as MCD 102.

Although the content servers 109-1, 109-2 are shown in FIG. 1 as separate entities, at least part of their functionality may be co-located with functionality of one or more of the enhanced device upgrade servers 108-1, 108-2 in certain implementations. Further, any of enhanced upgrade servers 108-1, 108-2 may also include service logic to compute or determine a customized upgrade recipe that may involve downloading of an upgrade file from a content server such as 106-1 which is compliant with the first protocol (e.g. an OMA-compliant protocol). Additionally, communications involving the client device 102 and one or more enhanced upgrade servers 108-1, 108-2 and one or more enhanced content servers 109-1, 109-2 may be effectuated using a second protocol that is different than the first protocol used with respect to the DM servers 104-1, 104-2. In one arrangement, the enhanced device upgrade servers 108-1, 108-2 and/or the enhanced content servers 109-1, 109-2 may be deployed as part of a vendor-specific or manufacturer-specific server implementation that is seamlessly interoperable within an existing arrangement that is compliant with the first protocol (e.g., OMA DM).

As is well known, device management pertains to, inter alia, configuration, provisioning client applications, and detecting problems of handheld communications devices from servers. In general, device management aims to encompass at least the following functionalities: (i) bootstrap provisioning, remote maintenance, and reporting of configuration data to a device; (ii) device diagnostics and fault management; and (iii) application and non-application software/firmware installation, update/upgrade, and management.

By way of example, an OMA-complaint DM methodology is set forth below although the teachings herein are equally applicable to other DM protocols and methodologies, mutatis mutandis. Each device that supports OMA DM contains a management tree, a structure that includes and organizes all the available management objects in a nodal arrangement such that each node can be directly accessed through a unique identifier such as a URI, wherein the nodes are entities that may be manipulated through the OMA DM protocol. Typically, two protocol phases are effectuated: a setup phase and a management phase. In the setup phase, an Alert (Packet 0) may be sent by a DM server to the device, whereupon the device client initializes (Packet 1) with the server using its credentials as well as device information. Thereafter, a server initialization process may take place using the server credentials, followed by initial management operations or user interaction commands from the server (Packet 2). In the management phase, the device client may generate one or more responses towards the server with respect to the management operations (Packet 3). In subsequent packets (e.g., Packet 4), more user interactions or management operations may take place if the DM session continues.

With respect to device firmware upgrading, the process may be initiated by a device client, a DM server, or by way of a user-initiated procedure. A companion management object in accord with the Firmware Update Management Object (FUMO) specification is provided that includes certain commands operable to be executed within the OMA DM protocol sessions for effectuating firmware upgrading. In a typical implementation, the DM server may use the FUMO protocol to first determine if an update is possible, using the identity information of the device, and then sets the FUMO object properties to define the update and the location of the download descriptor. Once the FUMO object properties are set, OMA DM requires that the server issue an EXEC command on the FUMO object (e.g., using a Synchronization Markup Language or SyncML based protocol). Upon receipt of the EXEC command, the device client is operable to retrieve the download descriptor and then proceed to download the actual upgrade/patch files listed in the descriptor from a download server (i.e., a content server). Once the files are downloaded, the device client can utilize other on-device facilities to apply the upgrades/patches to the software on the device. Typically, at various points in the update process, the device client may issue one or more status reports back to the DM server.

A number of potential scenarios for running an OMA DM firmware upgrade process using FUMO are set forth below.

Scenario I: Out-of-band download and immediate update: An EXEC command is issued to the device client by the DM server to operate on a specific node (DownloadAndUpdate node) within a FUMO tree portion (or sub-tree, as the case may be) of the management tree. This causes a download agent to be executed. After the download agent has completed its execution, an update agent is invoked. Upon the completion of the update agent, an Alert may be sent back to the DM server.

Scenario II: In-band download and immediate update: The upgrade package data is sent to the device in-band (i.e., during the management phase) and then an EXEC command is issued to the device client to operate on a specific node (Update node) in the FUMO tree. This action causes only the update agent to be invoked. After the update is complete, an Alert may be sent back to the DM server.

In the "out-of-band" Scenario I, a file describing the update is downloaded first, and it is passed on to the update agent of the device to handle at some later time (possibly chosen by the user, or otherwise, for example). Once the update agent is ready to proceed, it then downloads the upgrade/patch data or package and begins to process it. In the "in-band" Scenario II, the actual upgrade/patch data is downloaded and the update agent begins processing the data directly without the need for a descriptor file.

Scenario III: Out-of-band download, followed by an eventual update: This scenario requires two EXEC commands to be run. The first EXEC command is run on a Download node in the FUMO tree of the device, which causes the download agent on the device to download the upgrade package data. After the download is complete, an Alert may be sent back to the DM server. Thereafter, at some future time, the DM server issues another EXEC command to the device for execution on the Update node of the FUMO tree. This action causes the update agent to be executed. After the update is complete, an Alert may again be sent back to the DM server.

The package data may include a meta package definition file that contains properties operable to affect the entire software package including all application packages to be upgraded. Typically, the meta package definition file has information relating to each application package which identifies the application properties such as, e.g., the name of the application, the application URL, a version for the application package, etc.

An illustrative device upgrade process is described hereinbelow. A client device such as MCD 102 may be initially configured with DM bootstrapping information during the provisioning process. The bootstrap information may include, for example, the identity of the DM server (e.g., DM server 104-1) and identity of the device, respective authorization/credential information, and security bootstrapping parameters such as cryptographic keys. Such information may be recorded on or installed in the client device using any appropriate technology and in any appropriate manner. For example, it can be manually entered, embedded at the point of manufacture, loaded into storage of the device using other software and configuration update techniques (e.g., from a computer via a cable or network connection by a technician at a service facility or by the user), or loaded via a smart card or a removable Subscriber Identity Module (SIM). The DM server 104-1 is operable to control future interactions with the DM client software running on MCD 102 through the preparation of appropriate Markup Language (ML) documents (e.g., Extensible Markup Language or XML, Synchronization Markup Language or SyncML documents, etc.) and their transmission to the client device 102 either through a "Push" server (which can use Wireless Application Protocol (WAP), Short Messaging Service (SMS) or other transports), or in response to a device/client-initiated session (typically using a secure protocol such as secure HyperText Transfer Protocol (HTTP) or HTTPS). Using a SyncML channel (i.e., an HTTP connection over TCP/IP that is used for exchanging SyncML documents) or any other Markup Language channel, the server can query and set various properties of the management objects on the device. In particular, these objects allow the server to obtain the handset model, manufacturer, hardware identifier and software version, inter glia. Once an update is loaded into the OMA DM infrastructure, the management server can also use the SyncML channel to set parameters of the FUMO object controlling a possible update, including descriptive information, priority and the identity of the location of a "download descriptor" that defines where the device can obtain the files needed for an update.

A simplified progression of the steps in updating a device according to one embodiment which generally corresponds to Scenario I above may be set forth as follows:

1. DM bootstrap information including server ID and credentials is injected on the device (i.e., the handset), e.g., at the point of manufacture.
2. The DM server uses a Push server to push a request to the handset client that it initiate a session with the DM server.
3. The handset client opens an HTTPS session with the DM server.
4. The DM server uses the session to request device identity and version information from the handset.
5. The session is closed.
6. At some later point in time, the OEM provides an update package to the carrier DM server.
7. The carrier operator requests the DM server to initiate an upgrade of the device.
8. Steps 2-4 may be repeated to open a DM session and verify that the device identity and version information has not changed (as an optional sanity check).
9. The DM server uses the session to set the URL for the download descriptor in the device FUMO object.
10. The DM server issues an EXEC on the FUMO update.
11. The device client uses an HTTPS session to retrieve the download descriptor from the download server. It should be noted that the use of a download descriptor is optional and the URL can point directly to the patch data.
12. The device client uses further HTTPS sessions to retrieve the patch data from the download server.
13. The device client uses the downloaded patch data to allow the handset to perform the upgrade.
14. The device client uses HTTPS to notify the DM server that the upgrade is complete.

One skilled in the art will recognize that although only HTTP(S) over TCP/IP transactions have been illustrated in the foregoing, other transport mechanisms may also be implemented in certain embodiments. Further, the foregoing upgrade process, which may be compliant with OMA DM, SyncML or other device management protocols, may involve additional steps as well, and some of the illustrated steps have been simplified for purposes of the present patent application. Additionally, not all steps may be put into operation in a particular implementation.

Figure 2:
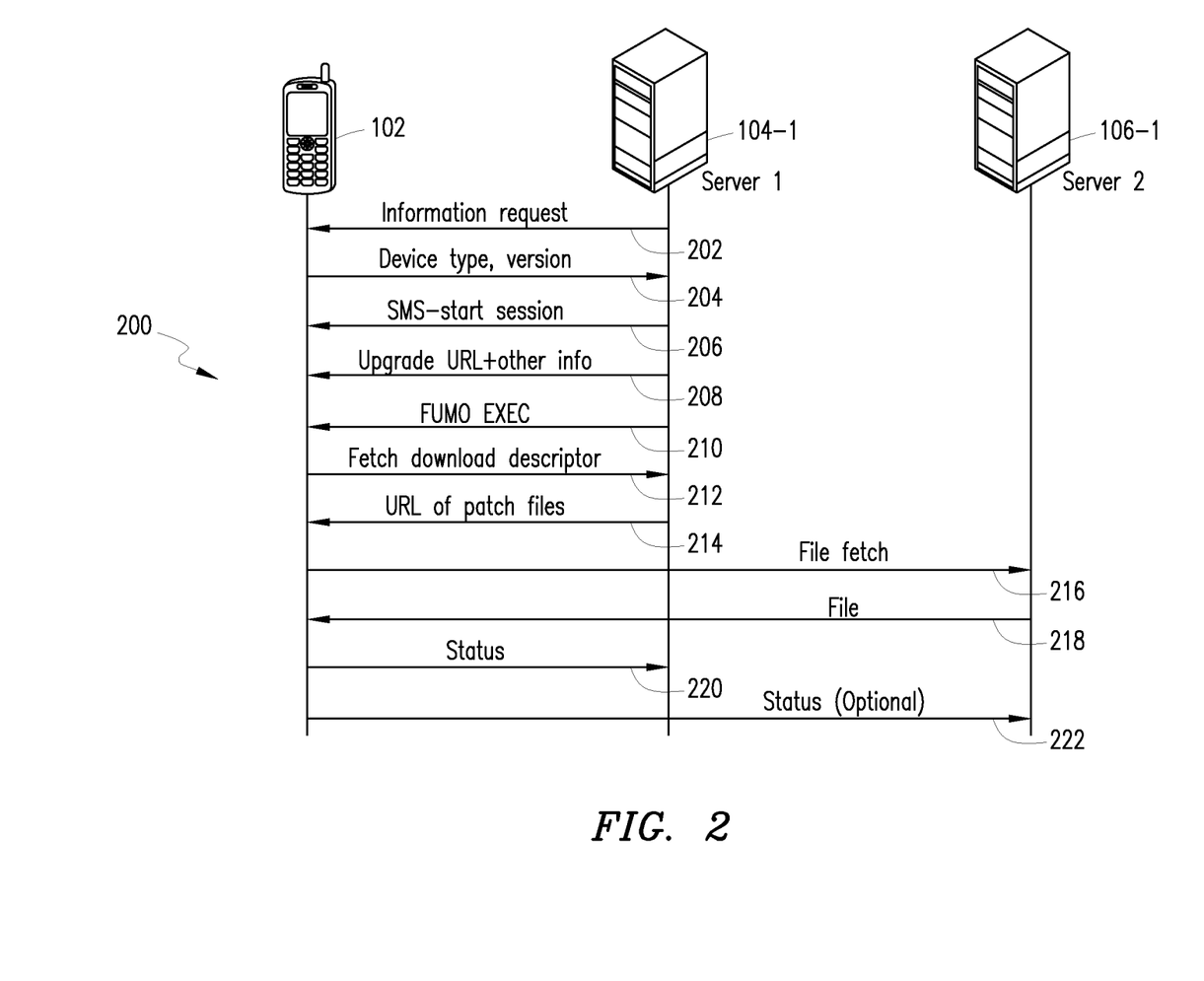
FIG. 2 depicts an example message flow diagram relating to a conventional device firmware upgrade process in accordance with OMA DM architecture.

Referring now to FIG. 2, depicted therein is a message flow diagram 200 relating to a conventional device firmware upgrade process in accordance with OMA DM that captures at least a subset of the steps described above. By way of example, an information request 202 (which could be an SMS message in one embodiment) from a first server (e.g., DM server 104-1) and a device response 204 including a device type and version from a device (e.g., MCD 102) are illustrative of a setup phase prior to establishing a device upgrade session therebetween. Another SMS message 206 from server 104-1 commences a session, whereupon an upgrade URL and other information may be transmitted (message path 208) to the client device 102, wherein the upgrade URL is indicative of the address location of a download descriptor file (DDF). A suitable FUMO EXEC command 210 is then issued to the client device 102, responsive to which appropriate download/update agents may be invoked. A Fetch command 212 may be issued by the client device 102 towards a server, which may in one implementation be the same as the first server 104-1, in order to obtain (message path 214) the URL(s) relating to one or more upgrade/patch files. Depending on the address information obtained, the client device 102 issues a File Fetch message 216 to one or more content servers (e.g., server 106-1). Responsive thereto, patch files or full size upgrade files are downloaded (message path 218) from appropriate servers, whereupon the applicable software/firmware code on the device is upgraded accordingly. Thereafter, a status message 220 may be issued to the first server 104-1. Optionally, a status message 222 may also be issued to the content server(s) 106-1 from which the patch files have been downloaded.

As one skilled in the art will recognize, patch files describe differences or "deltas" between two versions of a file, and in some embodiments contain a concisely-expressed list of directives in text form or some binary form, that can be used to convert one version of a file into another version. On the other hand, an upgrade file may be a full size version of a file. Accordingly, an upgrade file or package may comprise just a patch file or a full size file for purposes of the present patent disclosure.

The foregoing upgrade process is OMA DM compliant, in the sense that the OMA DM protocol is utilized throughout for the transactions involving one or more management servers and one or more content servers. However, as alluded to in the Background section of the present patent application, the foregoing upgrade scenario can be problematic with respect to handling complex device image information, integration with third party solutions, etcetera.

Figure 3:
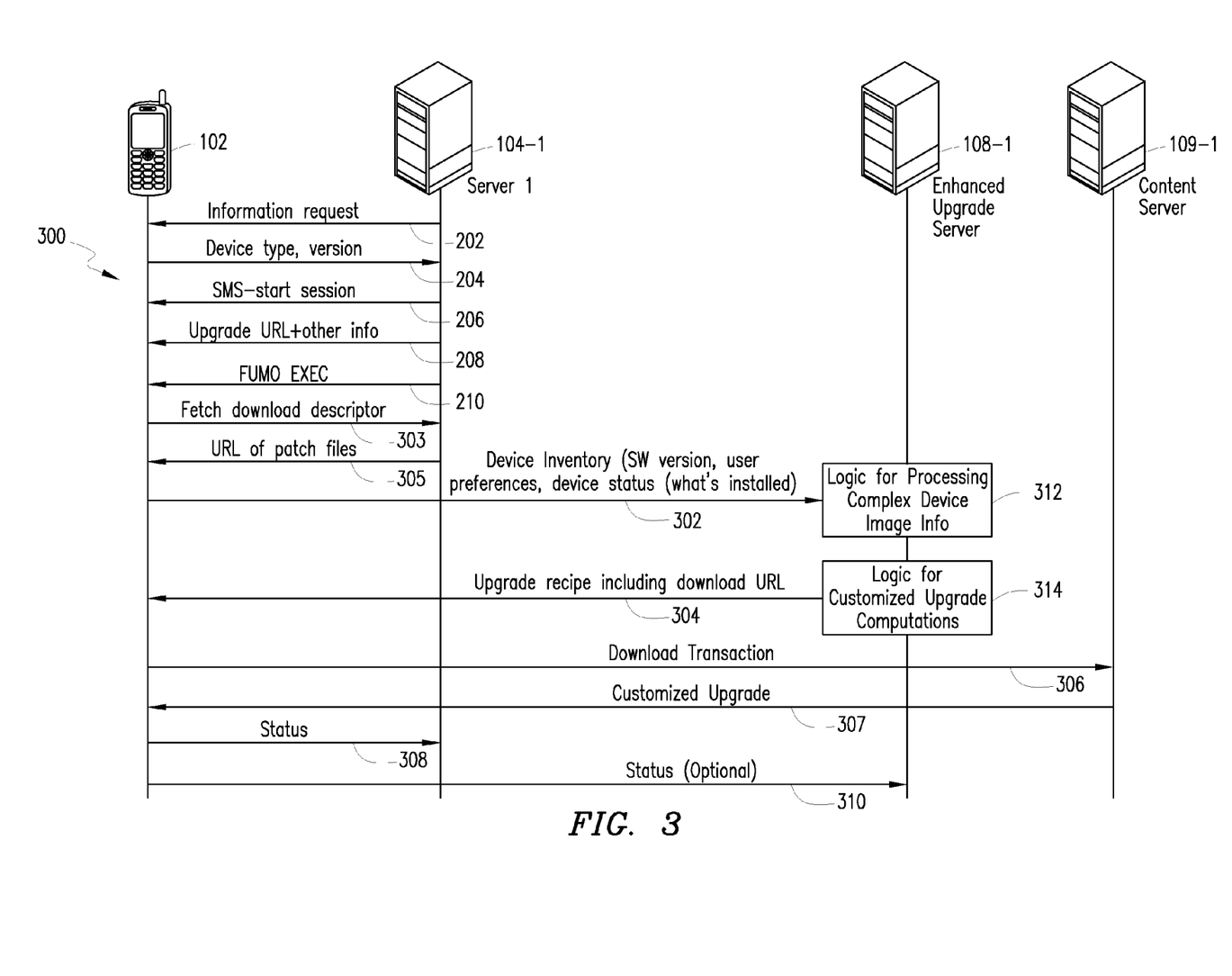
FIG. 3 depicts an example message flow diagram relating to a device firmware upgrade process according to an embodiment of the present patent application.

FIG. 3 depicts a message flow diagram 300 relating to an example device firmware upgrade process according to an embodiment of the present patent application that is operable within a known DM architecture (e.g., OMA DM) while allowing for integration with third party FOTA solutions that can include the capability of handling complex device image information for purposes of customizing upgrade recipes. Accordingly, by way of example, OMA DM transactions are illustrated here for transactions in the first protocol as shown in FIG. 2. Therefore, the information request 202 from a management server (i.e., first server 104-1) and the device response 204 including the device type and version from client device 102) are illustrative of a setup phase prior to establishing a device upgrade session therebetween. Additionally, in one implementation, the process flow involving message paths 204-210 is also similar to the process flow of the upgrade process illustrated in FIG. 2 with respect to the interactions between the client device 102 and the management server 104-1.

An artificial "Upgrade Details Document" is inserted after the FUMO EXEC command 210 and before the actual upgrade/patch file download in order to allow the device client 102 to supply extra device image information to a server for facilitating a more intelligent computation of a customized device download process. The delivery of the Upgrade Details Document (UDD) or some other document with the equivalent functionality (having upgrade information) that may be referenced via a DDF allows the client device 102 to be involved in the decision-making process of what needs to be updated, rather than forcing the client device to download upgrade files that might not be strictly required. Further, by placing the "Upgrade Details Document" on the DM server 104-1, the message flow for the server may be left unchanged, with the extra transactions (with respect to one or more enhanced upgrade servers such as 108-1, 108-2) being transparent to the DM server 104-1. In other words, even though transactions in addition to those defined in OMA-DM protocols may be used to complete an upgrade process, an existing OMA-DM-compliant DownLoad (DL) facility may continue to be used to download the "Upgrade Details Document" which in turn carries the identity of one or more services that carry out the upgrade process computations for the client device 102. In some embodiments, one or more of enhanced upgrade servers 108-1, 108-2 may be adapted to carry out the upgrade process computations for a particular class of client devices, for non-limiting example, devices of a particular vendor, of a particular Original Equipment Manufacturer (OEM), of a particular model, or devices employing a particular operating system or exhibiting other particular characteristics, or any groups or combinations of these. In addition, one or more of enhanced upgrade servers 108-1, 108-2 may be operated by a party other than the party that operates DM servers 104-1, 104-2, such as the device manufacturer, another OEM, another service provider, or the like. In this way, enhanced upgrade servers 108-1, 108-2 may be "third-party-specific" servers, and the services provided by enhanced upgrade servers 108-1, 108-2 may be "third-party-specific" services.

The foregoing operations relative to the Upgrade Details Document are illustrated by way of message flow paths 303 and 305 in FIG. 3, whereupon the identity information (e.g., URL(s)) of the enhanced upgrade servers are provided to the client device 102. Specifically, a DDF is requested in message flow 303 by the client device 102 and the DDF obtained by the client device (in message flow 305) is operable to reference a suitable UDD. Message flow path 302 refers to a transaction by the client device 102 issued to a server such as an enhanced upgrade server 108-1 that is identified via the identity information (e.g., the URL), using the UDD as an element of the communication. Further, the transaction 302 is operable to supply complex device image information, i.e., device inventory including software/firmware/hardware version data, user preferences and their status, device status information (as to what is installed, whether active, etc.) and the like, to the enhanced upgrade server 108-1. In composing the complex device image information of transaction 302, the client device 102 operates pursuant to program logic and configuration information contained in or available to the device. Appropriate service logic 312 at the server 108-1 is configured to process the complex device image information accordingly. Additional service logic 314 that may also be co-located with the server 108-1 is configured to perform customized upgrade recipe/process computations, including identifying one or more suitable URLs for the actual patch/upgrade files. Where service logic 312 is co-located with service logic 314 (i.e., they are in the same executable environment on a server, e.g., server 108-1), input 302 from the client device 102 has a direct effect on the output from service logic 314. However, if service logic 312 and service logic 314 are configured in a distributed server environment, appropriate inter-server communication may also take place as needed. Message flow path 304 is illustrative of a transaction issued from the server 108-1 to the client device 102 including the upgrade recipes and identity information relating to one or more servers hosting the upgrade/patch files. Using the identity information obtained from the server 108-1, the client device 102 is operable to issue a download transaction 306 to a content server, e.g., enhanced content server 109-1, whereupon one or more customized upgrade files are downloaded (message flow path 307) to the client device 102. It should be appreciated that although a single download transaction 306 is illustrated, there can be several such transactions (e.g., from about 50 or so to over several hundred transactions per upgrade process) that may be directed to respective content servers 109-X. Thereafter, similar to the process flow in FIG. 2, the client device 102 may engage in issuing one or more status reports to the management server 104-1 and, optionally, to the enhanced upgrade server 108-1, as illustrated by the message flow paths 308 and 310.

It should be realized that the message flow paths relative to the transactions with the enhanced upgrade servers and enhanced content servers may be effectuated using a protocol that is different than the OMA DM protocol used for effectuating transactions with the management server 104-1. By rendering such third party transactions transparent to an existing OMA DM platform, a variety of third party-specific upgrade processes may be seamlessly integrated therewith. Additionally, although only one third party upgrade server 108-1 and associated content server 109-1 are illustrated in FIG. 3, there may be more than one third party upgrade server and one enhanced content server in some implementations. In a further variation, the message flow path 208 relating to the transaction between the first server 104-1 and the client device 102 may include an in-band transmission (i.e., using the same communication channel as the rest of the information, as opposed to getting the information in a different way, such as via email, or a file on an SD card, for example) of an Update Details Document information as "other information", whereby transactions 303 and 305 may be skipped. In a still further variation, instead of fetching the download descriptor file (i.e., DDF) directly from server 104-1 as illustrated, the URL set in transaction 208 may point to another destination for the DDF. The EXEC command on this URL is operable to parse the DDF and follow the URL contained within it. That will in turn download the file from a Download Over the Air (DLOTA) server that transaction 303 downloads. It should be appreciated that the DDF file may be hosted on an OMA-DM server, DLOTA server, or any other compatible server as long as it contains information about how to obtain an Upgrade Details Document.

Figure 4:
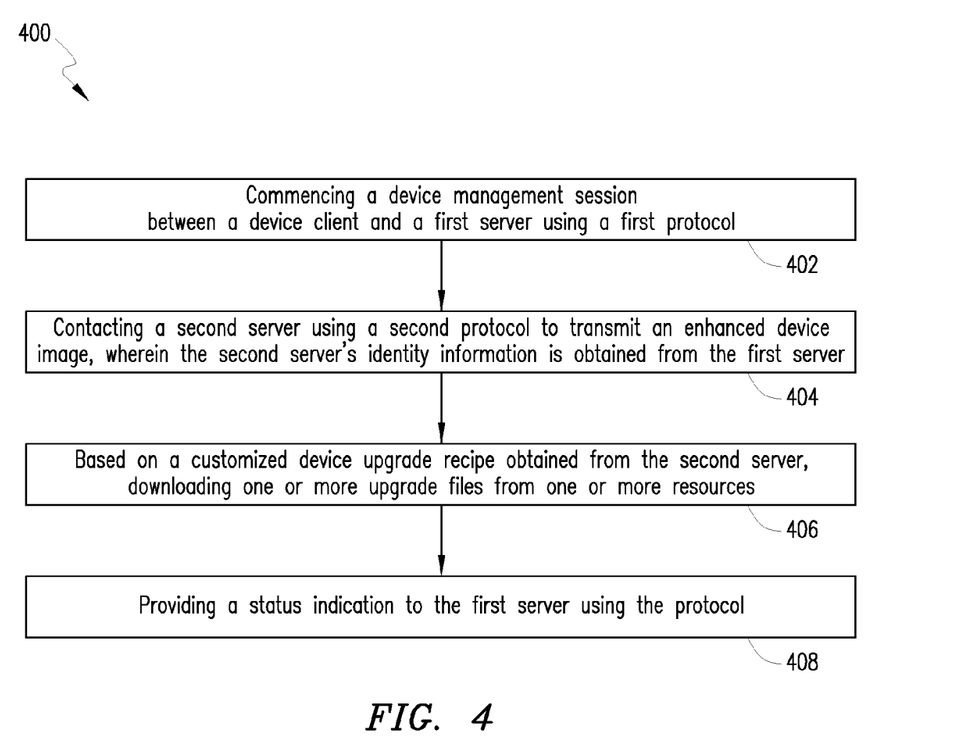
FIG. 4 depicts a flow chart relating to an example device firmware upgrade process according to an embodiment of the present patent application.

FIG. 4 depicts a flow chart relating to an example device firmware upgrade process 400 according to an embodiment of the present patent application. At block 402, a device management session is commenced between a device client and a first server using a first protocol. Thereafter, a second server is contacted using a second protocol to transmit information relating to an enhanced device image, wherein the second server's identity information (e.g., address, location, resource name/path, or identity, etc.) is obtained from the first server (block 404). Based on a customized device upgrade recipe or process obtained from the second server, one or more upgrade/patch files are downloaded from one or more resources (e.g., content servers) (block 406). Thereafter, a status indication may be provided to the first server using the first protocol (block 408).

Within the foregoing generalized framework, a sequence of events can be as follows: (i) the client device communicates with a carrier's infrastructure to obtain a DDF which references a UDD; (ii) the client device then communicates with another infrastructure (e.g., a third-party provider) using the UDD as an element of that communication to obtain information as to where the upgrade/patch files are located; and (iii) the client device then downloads the upgrade/patch files in one or more transactions and applies them for upgrading the device image, either immediately/automatically and/or based on user's command.

Figure 5:
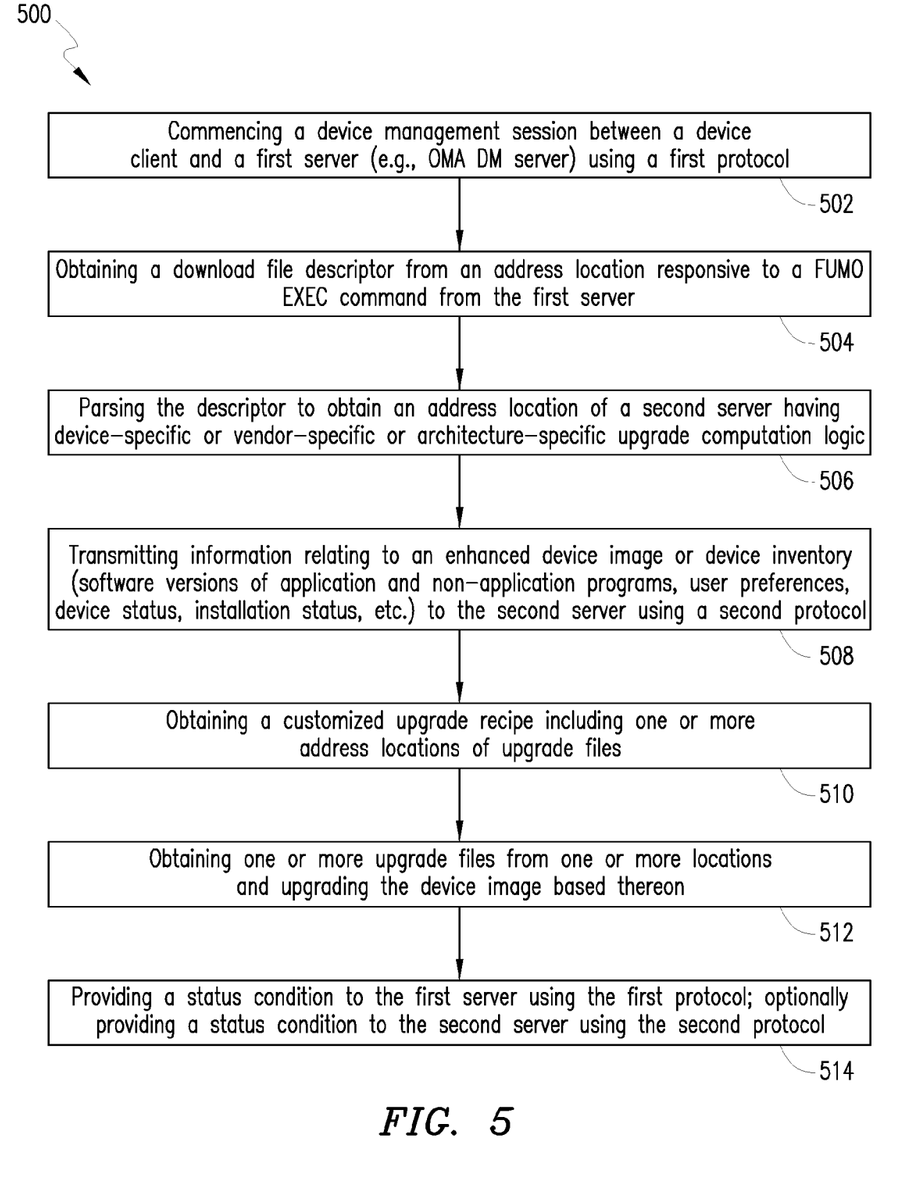
FIG. 5 depicts a flow chart relating to an example device firmware upgrade process according to further aspects of the present patent application.

Additional and/or alternative aspects of the foregoing upgrade process are illustrated in FIG. 5 by way of another embodiment 500. As before, a device management session is commenced between a device client and a first server (OMA DM server) using a first protocol (block 502). A download file descriptor is obtained from an address location or a resource identity responsive to a FUMO EXEC command issued from the first server (block 504), whereupon the device client parses the descriptor to obtain another address location or identity (e.g., a URL), of a second server having device-specific or vendor-specific or architecture-specific upgrade computation logic (block 506). The device client then transmits information relating to an enhanced/complex device image or device inventory associated with the client device, which may include software/firmware/hardware versions, versions of application and non-application programs, user preferences and their status, device status, installation status, etc., (i.e., device image or inventory information) to the second server using a second protocol (block 508). The second protocol may comprise HTTP or secure HTTP or any other appropriate protocol. The client device subsequently receives information from the second server defining a customized upgrade recipe including one or more address locations or identities (e.g., URLs) of the servers hosting the actual upgrade files (block 510). Customization may be specific based on a number of factors, such as e.g., device type, identity, its current location, etc. Using the identity information, the device thereafter obtains one or more upgrade files from one or more resources/locations and upgrades the device image based thereon, either immediately, automatically, after a delay, or based on some user command/input (block 512). Thereafter, a status indication may be provided to the first server using the first protocol. As a further option, a status indication may also be provided to the second server using the second protocol. These transactions are illustrated at block 514.

Figure 6:
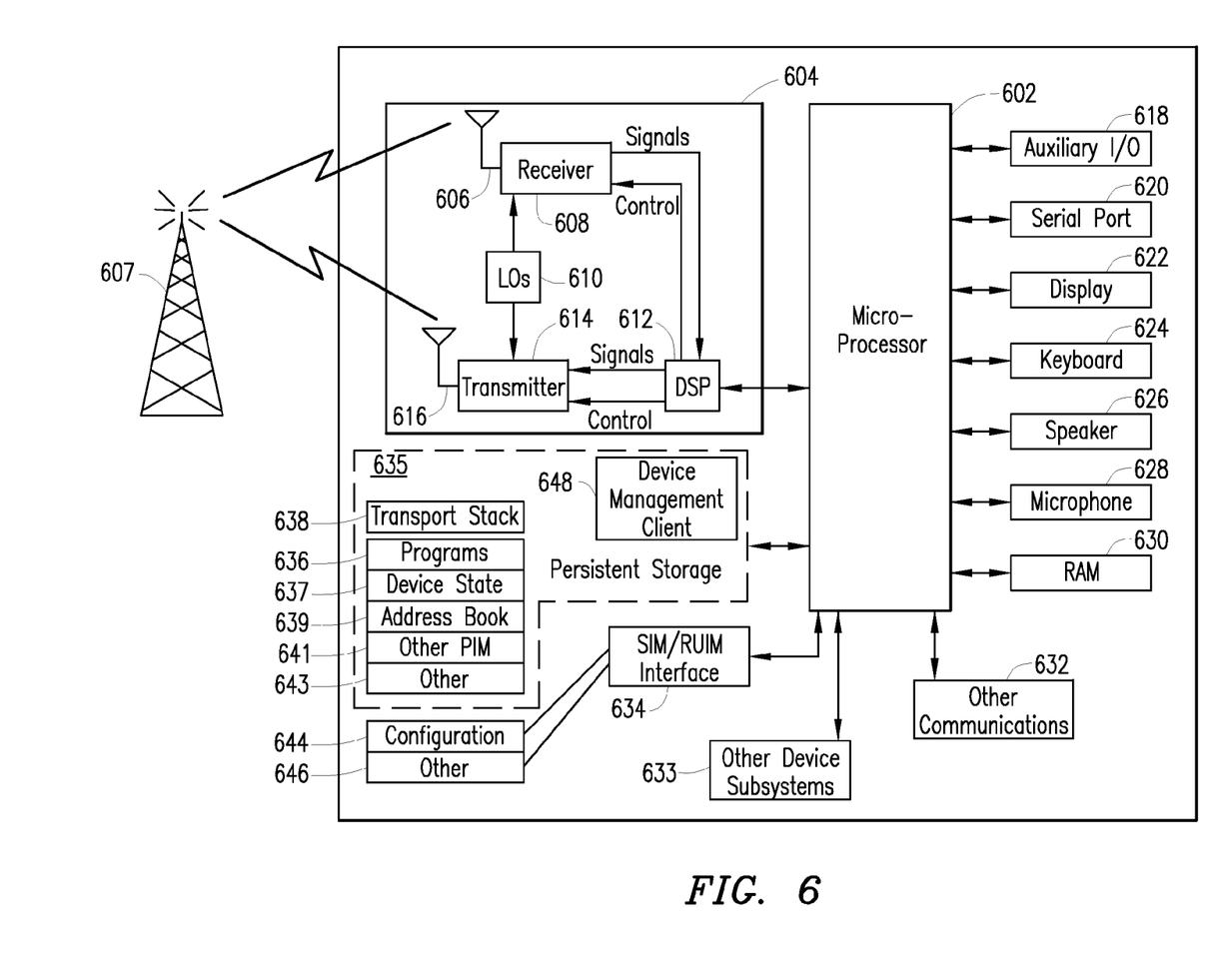
FIG. 6 depicts a block diagram of an example mobile communications device according to one embodiment.

FIG. 6 depicts a block diagram of an example handheld device (e.g., MCD 102) according to one embodiment that includes appropriate functionality to engage in upgrade process transactions with DM servers operable in one protocol as well as third party-specific servers operable in another protocol as described hereinabove. A microprocessor 602 providing for the overall control of an embodiment of MCD 102 is operably coupled to a communication subsystem 604 which includes a receiver 608 and transmitter 614 as well as associated components such as one or more local oscillator (LO) modules 610 and a processing module such as a digital signal processor (DSP) 612. As will be apparent to those skilled in the field of communications, the particular design of the communication module 604 may be dependent upon the communications network with which the mobile device is intended to operate. In one embodiment, the communication module 604 is operable with both voice and data communications. Regardless of the particular design, however, signals received by antenna 606 from a base station 607 are provided to receiver 608, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 612, and provided to transmitter 614 for digital-to-analog (D/A) conversion, frequency up conversion, filtering, amplification and transmission over the air-radio interface via antenna 616.

Microprocessor 602 also interfaces with further device subsystems such as auxiliary input/output (I/O) 618, serial port 620, display 622, keyboard 624, speaker 626, microphone 628, random access memory (RAM) 630, other communications facilities 632, which may include for example a short-range communications subsystem, and any other device subsystems generally labeled as reference numeral 633. To control access as well as supply the initial DM configuration, a Subscriber Identity Module (SIM) or Removable user Identity Module (RUIM) interface 634 is also provided in communication with the microprocessor 602. In one implementation, SIM/RUIM interface 634 is operable with a SIM/RUIM card having a number of key configurations 644 and other information 646 such as identification, DM configuration and subscriber-related data.

Operating system software and transport stack software may be embodied in a persistent storage module 635 (i.e., non-volatile storage) which may be implemented using Flash memory or another appropriate memory. In one implementation, persistent storage, module 635 may be segregated into different areas, e.g., storage area for computer programs 636 (which may include operation system software) and transport stack 638, as well as data storage regions such as device state 637, address book 639, other personal information manager (PIM) data 641, and other data storage areas generally labeled as reference numeral 643. Additionally, a DM client module 648 is provided for effectuating upgrade transactions in accordance with OMA DM protocols as well as other protocols, which may comprise standard protocols and/or third party-specific proprietary protocols according to the teachings set forth hereinabove. The DM client module 648 may also include suitable functionality associated with operations on a management tree or a portion thereof that is provided with the device.

Various processes, structures, components and functions set forth above in detail, associated with an upgrade server, enhanced content server or a mobile communications device, may be embodied in software, firmware, hardware, or in any combination thereof, and may accordingly comprise suitable computer-implemented methods or systems for purposes of the present disclosure. Where the processes are embodied in software, such software may comprise program instructions that form a computer program product, instructions on a computer-accessible media, uploadable service application software, or software downloadable from a remote station, and the like. Further, where the processes, data structures, or both, are stored in computer accessible storage, such storage may include semiconductor memory, internal and external computer storage media and encompasses, but is not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer executable medium."

Furthermore, it will be recognized by those skilled in the art upon reference hereto that the arrangements set forth in the Figures of the present application may comprise a number of variations and modifications, in hardware, software, firmware, or in any combination, usually in association with a processing system where needed, as components configured to perform specific functions. Accordingly, the arrangements of the Figures should be taken as illustrative rather than limiting with respect to the embodiments of the present patent application.

It is believed that the operation and construction of the embodiments of the present patent application will be apparent from the Detailed Description set forth above. While example embodiments have been shown and described, it should be readily understood that various changes and modifications could be made therein without departing from the scope of the present disclosure as set forth in the following claims.

What is claimed is:

1. A device firmware upgrade system, comprising:
a server configured to transmit to a mobile communications device, using a first protocol, identity information of an upgrade server adapted to operate with respect to said mobile communications device in a second protocol;
means located at said upgrade server for computing a customized upgrade process with respect to said mobile communications device based on device image information received from said mobile communications device using said second protocol, said device image information relating to a device image associated with said mobile communications device;
means for transmitting a transaction from said upgrade server to said mobile communications device in said second protocol, said transaction including information defining said customized upgrade process computed at said upgrade server responsive to said device image information, and identity information of one or more content servers having upgrade resources; and
at least one content server configured to process a download transaction received from said mobile communications device, said download transaction including said customized upgrade process computed at said upgrade server, wherein said at least one content server includes means for transmitting, responsive to processing said download transaction, one or more upgrade files based on said customized upgrade process to said mobile communications device.

2. The system of claim 1, wherein said device image information comprises an inventory of application programs on said mobile communications device.

3. The system of claim 1, wherein said device image information comprises an inventory of non-application programs on said mobile communications device.

4. The system of claim 1, wherein said device image information comprises an inventory of user preferences and their status with respect to said mobile communications device.

5. The system of claim 1, wherein said server operating in said first protocol comprises an Open Mobile Alliance (OMA) Device Management (DM) server using OMA DM protocol.

6. The system of claim 1, wherein said upgrade server comprises an Original Equipment Manufacturer (OEM) server and said second protocol comprises HyperText Transfer Protocol (HTTP).

7. The system of claim 6, wherein said OEM server is hosted by at least one of an enterprise network and a carrier network, and further wherein said HTTP is a secure HTTP.

8. The system of claim 1, wherein said server operating in said first protocol and said upgrade server operating in said second protocol are integrated as a co-located entity.

9. The system of claim 1, wherein said upgrade server and said at least one content server are integrated as a co-located entity.

10. The system of claim 1, wherein said one or more upgrade files are co-located on a single content server.

11. The system of claim 1, wherein said one or more upgrade files are located on multiple content servers.

12. A device firmware upgrade method, comprising:
transmitting from a server to a mobile communications device, using a first protocol, identity information of an upgrade server adapted to operate with respect to said mobile communications device in a second protocol;
receiving, at said upgrade server, device image information relating to a device image associated with said mobile communications device using said second protocol for computing a customized upgrade process with respect to said mobile communications device based on said device image information;
transmitting a transaction from said upgrade server to said mobile communications device in said second protocol, said transaction including information defining said customized upgrade process computed at said upgrade server responsive to said device image information, and identity information of one or more content servers having upgrade resources;
receiving a download transaction at a content server identified in said identity information received via said second protocol, said download transaction generated by said mobile communication device and including said customized upgrade process computed at said upgrade server; and
responsive to receiving said download transaction, transmitting one or more upgrade files from said content server based on said customized upgrade process to said mobile communications device.

13. The method of claim 12, wherein said device image information comprises an inventory of application programs on said mobile communications device.

14. The method of claim 12, wherein said device image information comprises an inventory of non-application programs on said mobile communications device.

15. The method of claim 12, wherein said device image information comprises an inventory of user preferences and their status with respect to said mobile communications device.

16. The method of claim 12, wherein said first protocol comprises an Open Mobile Alliance (OMA) Device Management (DM) server using OMA DM protocol.

17. The method of claim 12, wherein said second protocol comprises one of HyperText Transfer Protocol (HTTP) and secure HTTP.

18. The method of claim 12, wherein said identity information of said upgrade server is transmitted via an Upgrade Details Document from said server operating in said first protocol.

19. The method of claim 18, wherein said Upgrade Details Document is transmitted after sending a Firmware Update Management Object (FUMO) Exec command from said server in a device management session with said mobile communications device.

20. A non-transitory tangible computer-readable medium embodying a nonvolatile memory and containing program instructions stored thereon which facilitate upgrading of device firmware when executed by one or more processors associated with a mobile communication device, the non-transitory tangible computer-readable medium comprising:
a code portion configured to initiate a device management session with a server using a first protocol for obtaining identity information of an upgrade server adapted to operate with said mobile communications device in a second protocol;
a code portion configured to effectuate transmission of device image information relating to a device image associated with said mobile communications device to said upgrade server using said second protocol for computing a customized upgrade process with respect to said mobile communications device based on said device image information;
a code portion configured to process an upgrade transaction received from said upgrade server, said upgrade transaction including information operative for defining said customized upgrade process and identity information of one or more content servers having upgrade resources;

a code portion configured to issue a download transaction to at least one of said one or more content servers based on said identity information received via said second protocol, said download transaction including said customized upgrade process computed at said upgrade server;

a code portion configured, responsive to issuing said download transaction, to receive one or more upgrade files from one or more content servers based on said customized upgrade process; and a code portion configured to provide a status indication to said server using said first protocol upon completion of upgrading at least a portion of said mobile communications device's device image based on said one or more upgrade files.

* * * * *